United States Patent
Newham et al.

(10) Patent No.: US 8,111,187 B2
(45) Date of Patent: Feb. 7, 2012

(54) SURVEILLANCE SYSTEM AND METHOD

(75) Inventors: Paul Newham, Basildon (GB); Michael Michael, Basildon (GB); Michael Roos, Basildon (GB)

(73) Assignee: Selex Galileo Ltd, Essex (GB)

( * ) Notice: Subject to any disclaimer, the term of this patent is extended or adjusted under 35 U.S.C. 154(b) by 100 days.

(21) Appl. No.: 12/530,346

(22) PCT Filed: Mar. 5, 2008

(86) PCT No.: PCT/EP2008/052666
§ 371 (c)(1),
(2), (4) Date: Sep. 8, 2009

(87) PCT Pub. No.: WO2008/107456
PCT Pub. Date: Sep. 12, 2008

(65) Prior Publication Data
US 2010/0019948 A1    Jan. 28, 2010

(30) Foreign Application Priority Data
Mar. 7, 2007 (GB) .................................. 0704398.7

(51) Int. Cl.
*G01S 13/00* (2006.01)

(52) U.S. Cl. ............................ 342/90; 342/147; 342/176

(58) Field of Classification Search .................... 342/90, 342/147, 176
See application file for complete search history.

(56) References Cited

U.S. PATENT DOCUMENTS

| | | | |
|---|---|---|---|
| 5,365,236 A * | 11/1994 | Fagarasan et al. | 342/53 |
| 5,812,083 A | 9/1998 | Johnson et al. | |
| 6,876,321 B1 | 4/2005 | Slutzky et al. | |
| 7,397,415 B1 * | 7/2008 | Wang et al. | 342/13 |
| 7,411,539 B2 | 8/2008 | Valand | |
| 2005/0033789 A1 * | 2/2005 | Sirois | 708/422 |
| 2006/0132348 A1 * | 6/2006 | Valand | 342/13 |
| 2006/0227035 A1 * | 10/2006 | Gounalis | 342/13 |
| 2008/0192864 A1 * | 8/2008 | Szajnowski | 375/340 |

FOREIGN PATENT DOCUMENTS

| | | |
|---|---|---|
| EP | 1316817 A2 | 6/2003 |
| GB | 2160686 A | 12/1985 |
| WO | WO 88/01750 A1 | 3/1988 |
| WO | WO 99/53339 A1 | 10/1999 |
| WO | WO 2004/113949 A1 | 12/2004 |

OTHER PUBLICATIONS

International Search Report for PCT/EP2008/052666 completed Jul. 10, 2008.
UK Search Report for GB0704398.7 completed Apr. 8, 2008.
The Kinetic SBS-1, Kinetic Avionic Products Innovation for Aviation, 17 pages.
www.neafc.org/reports/peccoe/oc (available from IB), whole document.
Office Action dated Feb. 8, 2011 in corresponding European Patent Application No. 08 717 416.5-1248, 4 pages.

* cited by examiner

*Primary Examiner* — Timothy A Brainard
(74) *Attorney, Agent, or Firm* — Buchanan Ingersoll & Rooney PC (57) ABSTRACT

A passive system is described for detecting radar emissions from vessels, receiving the radar emissions and analysing the data using a series of algorithms and software manipulation to extract radar signatures representative of the identity of the vessel. The data output is capable of comparison with a stored set of data enabling accurate identification of the vessel. The resulting output is displayed on a suitable display. A system having a library of vessel emission signatures can either be created within the operator's library through measurement made, or it can be supplied from a central database. The system is capable of installation on sea, land or air-based platforms.

7 Claims, 7 Drawing Sheets

SURVEILLANCE SYSTEM AND METHOD

The invention relates to a surveillance system. More particularly, but not exclusively, the invention relates to a surveillance system passively detecting and measuring predetermined parameters emitted from a vessel such that the identity of the vessel can be established.

For individual nations, the task of patrolling sovereign waters and Exclusive Economic Zones is of critical importance. Fishing stocks and under-sea wealth need to be protected from the depredations of vessels operating illegally. Additionally, vessels operating narcotics and drug runs need to be detected and their activities monitored. Detection of such vessels are available that detect the presence of these vessels, however such systems have disadvantages. Firstly most systems provide information that a vessel exists but not the identity of the vessel. Secondly, such systems often require the detection system to be within the detection range of the host vessel's radar systems.

According to the invention there is provided a system for detecting and identifying vessels, the system comprising detecting means and comparing means, the detecting means receiving predetermined emissions from the vessel, the comparing means receiving data output by the detecting means and comparing said data to a library of existing data and outputting a signal representative of the identity of the vessel capable of display on suitable display means such that the identity of the vessel can be established.

According to the invention there is further provided a method of identifying a vessel, comprising the steps of:
(a) detecting radar emissions from a target vessel;
(b) measuring the radar emission;
(c) analysing the measured radar emission;
(d) statistically manipulating the analysed emissions to extract a signature representative of the identity of the vessel;
(e) comparing the signature with a library of stored known signatures to successfully identify the vessel; and
(f) displaying the identity of the vessel on suitable display means.

It is an advantage of such a system that a platform specific signal is generated for each target vessel that can be cross correlated between sensor platforms.

The invention will now be described with reference to the following diagrammatic drawings in which.

The Passive Littoral Surveillance (PALS) radar Electronic Support Measures (ESM) system is a passive sensor that provides information over and above that which is currently available by current host ships' systems. With an effective range normally beyond that currently offered by host ship radar, PALS passively detects and measures the parameters of radar emissions from vessels of interest. These parameters are analysed by a software package known as Enhanced Emitter Identification (EEI) to extract a specific signature from the radar emission, which is then compared against a library of vessel signatures for a match. When a match is confirmed, the vessel identity is displayed on the Man-Machine Interface (MMI).

A library of vessel emission signatures can either be created within the operator's library through measurements made during the mission, or it can be supplied from a central database of previously measured vessel signatures, supplied to the ship prior to the start of mission.

The result of the library matching is displayed on the MMI, which lets the operator promptly establish whether it is a known or unknown vessel.

Vessel identification in this way will significantly improve situational awareness of the sea-space.

In order to ensure that consistent EEI values for a particular emitter are measured on a day to day basis, and also between various platforms supporting PALS, it is essential that an accurate clock reference is used. Typical Radar Warning Receiver (RWR) type receivers use a quartz crystal clock, which may not be ovened, and therefore sensitive to temperature changes. Thus, the various EEI parameters based on time measurements may vary from day to day. Use of a rubidium clock would improve the time reference by orders of magnitude. Phase locked to input from a GPS receiver, which provides an extremely accurate one pulse per second, the timing measurements could be made consistent between platforms. This would enable accurate cross-correlation to be maintained. Such a clock would also improve the accuracy of frequency measurement using a zero-crossing technique.

The EEI programme is totally general purpose, and is not limited to any specific RWR system. It is designed to be embedded into the MMI computer, and called from the MMI programme. All that is required of the system is to collect a sufficient number of pulse descriptors to enable the EEI statistical calculations to be carried out effectively. For this purpose, the detected pulses will need to be pre-processed through a suitable de-interleaver package in order to associate pulses unique to the emitter of interest. Each digitised pulse descriptor word should contain as a minimum the following parameters, with the associated typical resolution frequency (4 MHz), pulse width (50 ns), pulse time of arrival (100 ns), pulse amplitude (0.5 dB). The EEI package can work effectively with at least 800 pulse descriptors, which will have been collected and saved to a text file. Pulse data contains time of arrival information from which Pulse Repetition Interval (PRI) can be deduced.

The statistical techniques developed for the EEI software are capable of computing the emitter radar parameters to a very fine degree of accuracy, well in excess of the measurement resolution. This results in much enhanced rejection of similar radar signatures when carrying out library matching. Parameter accuracy increases as the number of pulses in the dataset increases.

PRI analysis comprises a major part of the EEI processing, and is carried out first. This is because stray pulses that were not filtered out by the de-interleaver will be most readily detected by the histogramming techniques intrinsic to the PRI analysis. Once the PRI elements have been computed, whether stable, staggered or jittered, the data is then filtered to remove those pulses that fall outside these values. Following on from this, the frequency data is processed, either to compute the mean value, together with its standard deviation, or to detect a frequency agile signal, and compute either its spread, or its distinct frequency values from a histogram of the distribution. The technique also pertains to pulse width. The scan period analysis is then carried out. If a single scan period is deduced, this enables the individual scan bursts to be superimposed, to yield an accurate representation of the emitter radiation pattern from which the 3 dB and 10 dB beamwidths can be deduced. Operation of the EEI algorithms is determined by a number of crucial constants that are user-adjustable. These are contained within a performance parameter text file, and the user is able to modify these parameters to fine-tune the operation of the EEI software.

A crucial component of EEI programme is a sophisticated peak detection algorithm that identifies all peaks above a pre-determined threshold in a histogram. It first carries out pre-detection filtering on the data to eliminate noise peaks.

The PRI pattern is fundamental to EEI. All PRI patterns can be divided into four main categories: Stable (single constant PRI); Regular Stagger (repetitive group of fixed PRI elements in fixed order, with fixed frame interval); Random Stagger (group of fixed PRI elements, but in random order—no frame interval); and Jitter (random PRI comprising one or more non-harmonic clusters).

The PRI pattern can generally be deduced by histogramming all time differences between pulses in the dataset. This enables a stable PRI to be immediately identified. A regular stagger can also be identified from its fixed frame interval. If neither a stable PRI, nor a stable frame interval is found, then the PRI is either a random stagger or a jittered PRI. Further investigation under high resolution can generally identify a random stagger. Failing this, the jitter pattern may comprise a single PRI cluster, or multiple clusters which are non harmonically-related.

Typically RWR systems provide pulse Time Of Arrival (TOA) at 100 ns resolution. Use of 1 μs histogram bins reduces memory requirements, without compromising peak detection.

Figure 1:
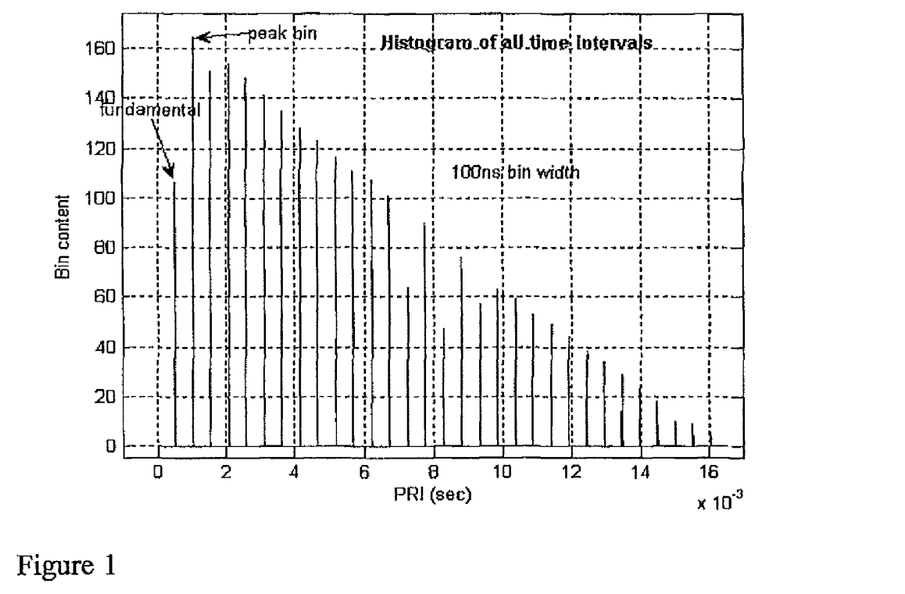
FIG. 1 shows a typical PRI histogram for stable PRI showing fundamental PRI generated by one embodiment of the invention.

Typical PRI histogram for stable PRI is shown in FIG. 1.

The peak bin may not be the fundamental PRI because of statistical fluctuations in the data, but is most unlikely to be greater than the 10th harmonic. The peak bin pkpos is located first, and then a search of the upstream data for a secondary peak that is more fundamental, (i.e is a factor of the peak bin) is undertaken. This peak is then re-identified as the fundamental bin.

There may be more substructure at high resolution that identifies the emitter as a narrow jitter. So a second histogram is created at 100 ns resolution covering a 4 μms region centred on the fundamental PRI (See FIG. 2). In order to confirm a stable PRI, 4 conditions must be satisfied, and determined by a subset of performance parameters:
a) no significant bin activity occurs below pkpos-2
b) no significant bin activity occurs downstream of pkpos, as far as 1.5*pkpos, i.e. halfway to the next harmonic
c) in the high resolution histogram, no significant activity occurs in the 2nd nearest neighbours of the peak bin
d) only one peak appears in the high resolution histogram.

Figure 2:
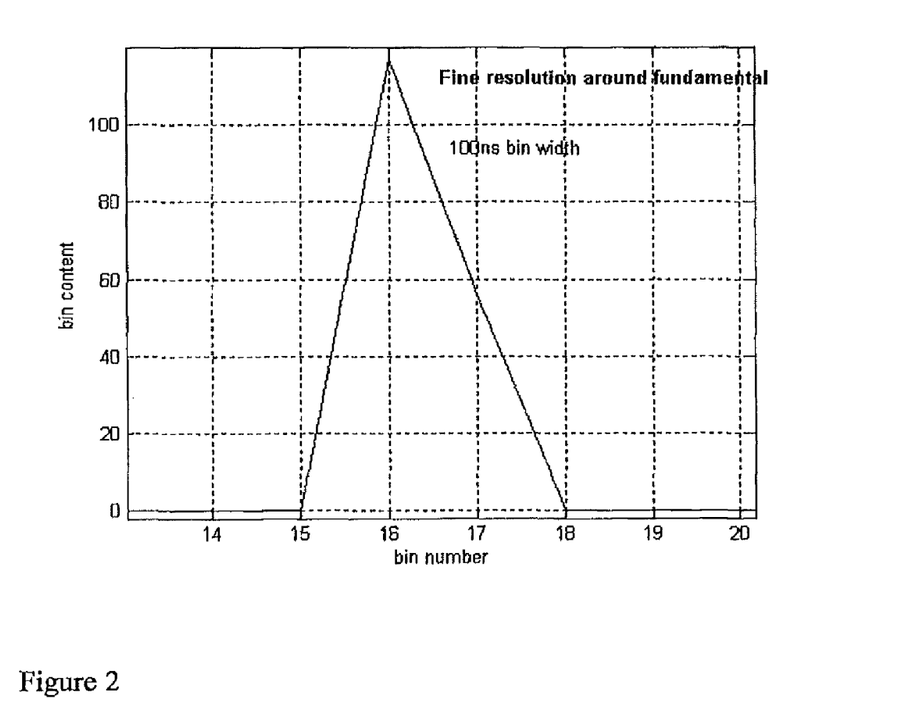
FIG. 2 shows a second histogram at 100 ns resolution covering a 4 μs region centred on the fundamental PRI of FIG. 1.

The stable PRI value is the weighted average of the peak bin and its 2 nearest neighbours. For example, the stable PRI is the mean of all the PRIs within 200 ns of pkpos2. If the above tests fail, then the stagger algorithm is invoked.

Although typical RWR systems resolve TOA to 100 ns, there are newer receivers on the market with much higher resolution, such as 16 ns. In all time-related histograms described in the paper, it is important to choose a suitable fine histogram bin width which does not require excessive memory and processing requirements. 100 ns resolution is suitable for jitter histograms to avoid the likelihood of break-up of a jitter cluster at higher resolution into false sub-clusters. Full time resolution is only appropriate for determination of a stable PRI or the elements of a staggered PRI to high accuracy. The time resolution of the receiver can be entered as a performance parameter.

The coarse PRI histogram contains a series of harmonics of the fundamental PRI cluster. If a Fourier transform is taken of the histogram, the position of the first peak in the spectrum is inversely related to the cluster period in the histogram. The histogram can thus be subdivided into a series of periods, each centred on a cluster harmonic. The first cluster contains the fundamental PRI elements. If the emitter is a true regular stagger with N elements, then the N'th period will comprise a single peak corresponding to the frame interval. The approach taken is therefore to carry out a peak detection for each period in turn, and stopping when only one peak is found. If no single peak is detected before noise sets in, then the stagger search is aborted and the jitter algorithm is initiated. If a single peak is identified, a new histogram at 100 ns resolution is made of this period, and further checks are made that only a single bin is occupied, with spill-over into adjacent bins. The weighted mean of these three bins is taken to be the frame interval. The period number of the frame interval is then identical to the number of elements in the stagger, all of which will appear in the first cluster of the histogram. A new histogram at 100 ns resolution is then made of this first cluster, and the peak detection algorithm is invoked to determine the unique stagger elements. If there are repetitions, then the number of peaks will be less than the number of stagger elements. However, the relative amplitude of each peak (sum of peak and nearest neighbours) will be proportional to its number of repetitions.

Figure 3:
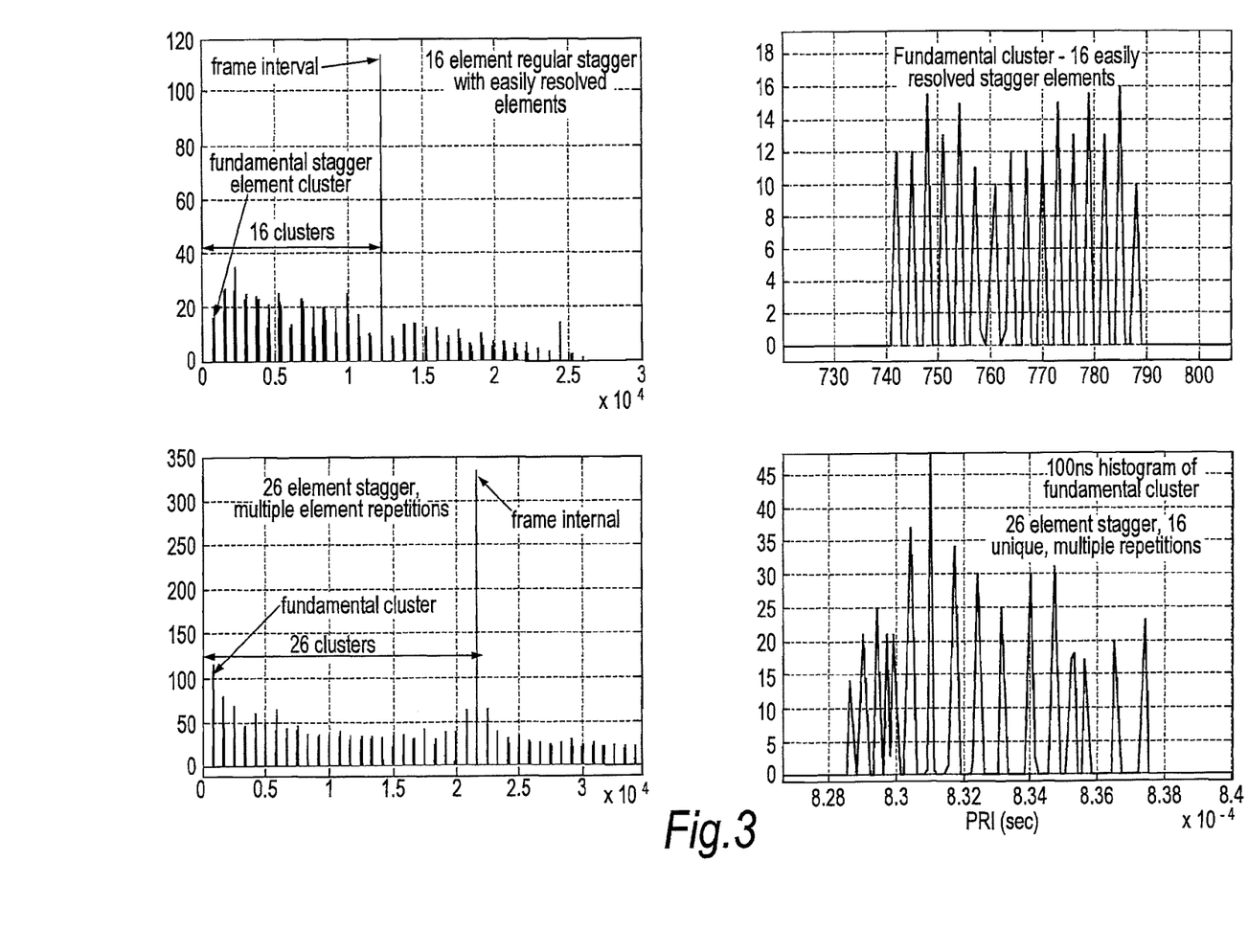
FIG. 3 shows two contrasting cases for a first and second emitter target, the first emitter having 16 stagger elements resolvable at 1 μs resolution indicative of the fact that no repetitions occur, the second emitter having 26 clusters up to the frame interval, the fundamental cluster having 16 stagger elements resolvable, the widely differing bin amplitudes indicative that a number of repetitions occur.

FIG. 3 illustrates the contrasting cases for two regular staggers.

The first emitter has 16 stagger elements easily resolved at 1 μs resolution, and equal to the number of clusters up to the frame interval. All bins have approximately the same amplitude, indicative of the fact that no repetitions occur.

The second emitter has 26 clusters up to the frame interval, but even at 100 ns resolution, the fundamental cluster only resolves 16 elements. The widely differing bin amplitudes indicate that a number of repetitions occur.

It is possible that an emitter will alternate between two regular stagger sequences. This will be characterised in the PRI histogram by a frame interval comprising two closely spaced peaks. In addition, the number of cluster intervals up to the frame interval will be about half the number of elements in the first cluster. The stagger elements are separated into the two frames on the basis that the first few elements will be associated with the shorter frame interval, and the element spacings are approximately constant for each frame. The elements are output in ascending order for each frame interval. No attempt is made to order them, as would be the case for a single regular stagger, nor to identify the number of repetitions.

The previous histogram method of computing the stagger elements and their repetitions does not enable their order within a frame interval to be determined. This requires processing of the raw pulse data which contains the necessary information.

Pulses will only be detected if their amplitude exceeds the RWR detection threshold. For most of a scan period, the antenna is pointing away from the RWR, and only sidelobes are present, which are generally below threshold. Thus, pulses are only detected in bursts that may occur for less than a frame interval. For a long pulse burst, it is straightforward to correlate all stagger elements to the first complete frame interval. Whenever a lost pulse is detected, the algorithm simply begins rebuilding a frame interval from the next pulse.

For short pulse bursts it is necessary to compute where in the frame the first pulse of the next scan burst occurs. This can be achieved by first computing the mean PRI of a stagger frame, and then, with the time difference between the last pulse of one burst and the first pulse of the next, computing how far along the frame interval the next burst begins. It is then relatively straightforward to build up the stagger frame. The idea is to present all stagger elements in the correct order in which they appear in the frame.

The normalised amplitude of the stagger elements of a double frame stagger in the PRI histogram will give some indication of the number of repetitions in each frame. It is therefore of some interest to output these values for the purposes of library matching. Although this does not provide any further information for single frame staggers, since repetitions will have already been deduced, the normalised amplitude of each element, divided by the number of repetitions for that element is also output. This also applies to random staggers.

If both the stable and regular stagger algorithms fail, then the PRI is designated as a jitter, which may also turn out to be a random stagger (i.e. fixed PRI elements in random order, therefore no frame interval). The jitter could be comprised of multiple clusters. First, the limits of the fundamental jitter cluster are identified. Then the PRI histogram is searched downstream as far as the start of the second harmonic for any additional clusters comparable in amplitude with the fundamental cluster. If one or more additional clusters are detected, this is a multi-point jitter. The limits of these clusters are determined, and the resolution of each cluster increased to 100 ns to precisely determine their PRI ranges. Finally the number of jitter clusters and their limits is returned to the calling program.

If only one jitter cluster is detected, a random stagger is checked for at 100 ns resolution. This will have discrete peaks with no second nearest neighbours, and approximately equally spaced in PRI with multiple zero-entry bins. The weighted mean of each discrete PRI and its normalised amplitude is then output.

If no random stagger is detected, the PRI limits of the cluster are returned and a low resolution histogram of the cluster to be used for library matching is returned.

Figure 4:
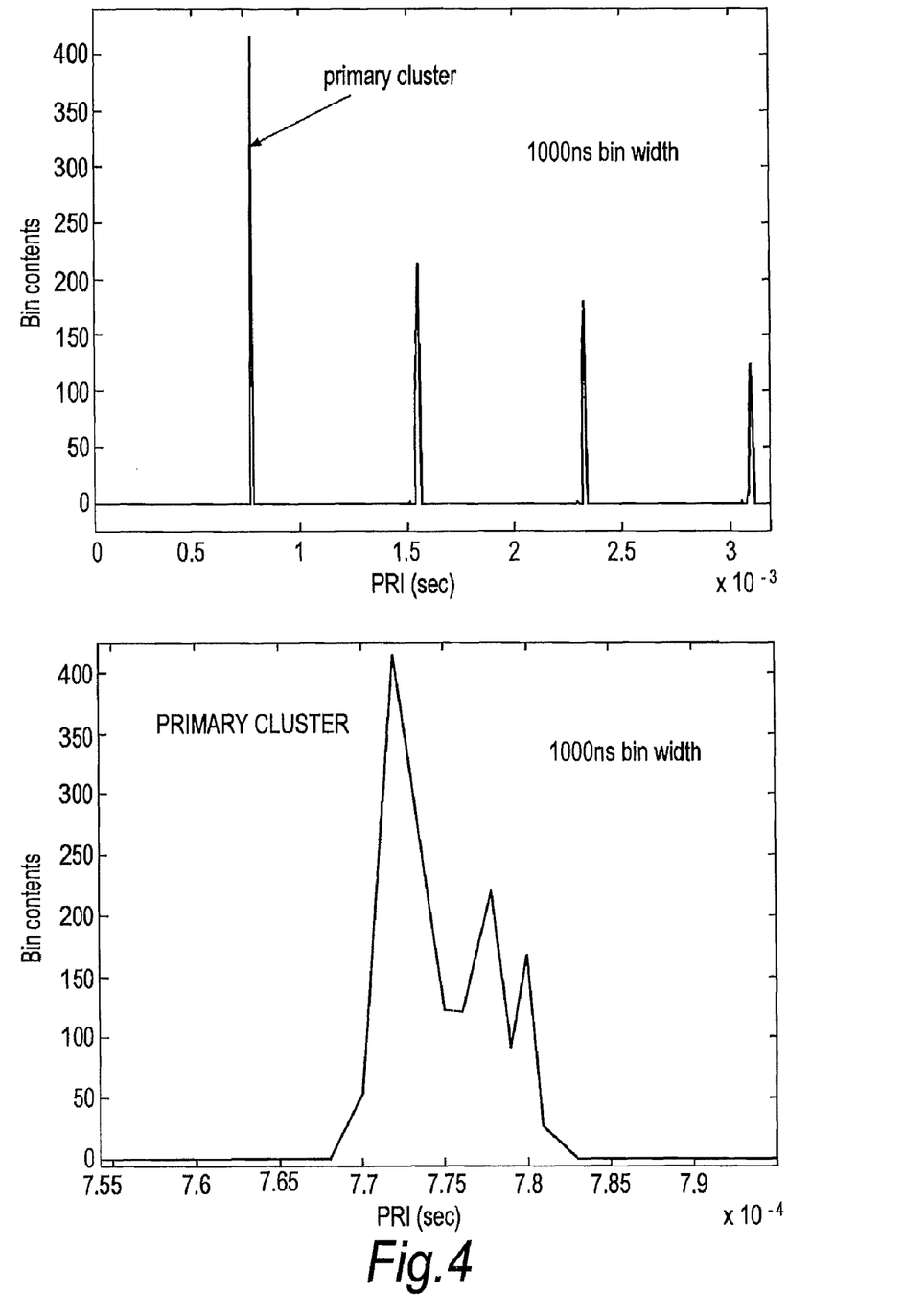
FIG. 4 shows two graphs representing normal single-point jitter characteristics at (coarse) 1 μs resolution and (fine) 100 ns resolution.
Figure 5:
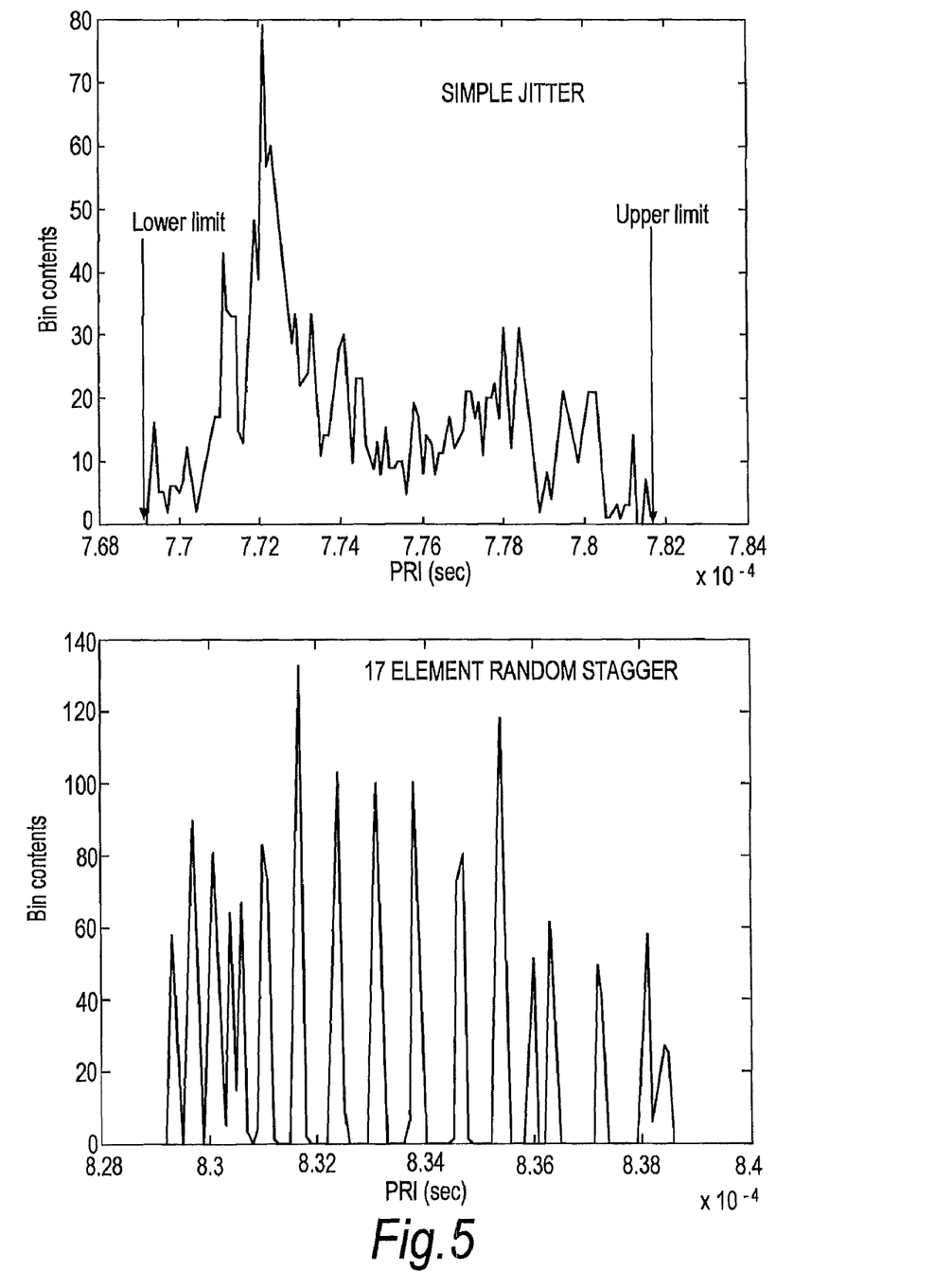
FIG. 5 shows two graphs representing different characteristics of a normal jitter scenario and a random stagger scenario at a fine resolution.

FIG. 4 shows typical cases for a normal jitter at coarse (1 μs) resolution and at fine (100 ns) resolution. FIG. 5 shows the different characteristics of a normal jitter and a random stagger at fine resolution.

If the PRI analysis has been successful, the data is then filtered to eliminate contaminant pulses. For a stable PRI, only pulses with PRI within ±200 ns of the mean value are selected. For regular or random stagger, only pulses with PRI within ±200 ns of one of the stagger elements are selected. For a jitter, the pulse PRI must lie within the jitter limits. The performance parameter data file specifies a minimum acceptable percentage of filtered pulses. If the number of filtered pulses is less than this, either the PRI analysis is in error, or a large contaminant is present. In this case a warning code is generated to indicate unreliable data, and all the pulses are returned. Either or both of the emitter frequency and pulse width may be agile. The agility may comprise a continuous spread or a series of discrete values. The structure can be revealed by histogramming the data at the finest resolution; e.g. 5 MHz for frequency, and 50 ns for pulse width. If a continuous spread is detected, the useful parameters to output are the limits, the mean and its standard deviation. If discrete peaks are detected in the histogram, the weighted mean of each peak, utilising the peak bin and its two nearest neighbours, are also returned.

Many receivers have variable pulse width resolution. For example, for pulse widths below 4 μs the resolution could be 50 ns, whereas at 200 μs the resolution could be typically 5 μs. It is therefore imperative that the pulse width histogram bins should reflect this variable resolution. The approach taken is to use a Look-Up Table (LUT) containing a list of pulse width values that the receiver can output. These values will then define the histogram bin centres, and the histogram will cover the complete range of measurable pulse widths. Fine structure in pulse width agility is then readily detected over the whole range. Frequency resolution will depend upon the measurement method. Some receivers may have a fixed resolution of say 5 MHz, whereas others may use a method of counting the number of zero-crossings in a fixed period of time. In the latter case the accuracy of the measurement will depend upon the pulse width, and it is preferable to choose a frequency histogram bin width commensurate with the accuracy of the measurement in order to avoid mistaking random fluctuations for frequency agility. A suitable algorithm can then be used to define the frequency bin width as a function of the minimum measured pulse width if such a functional relationship exists. Alternatively, the LUT can contain a second column of frequency resolution for each pulse width entry in the table.

Most emitters have a circular scan with a period that is unique to its mechanical configuration. Thus an accurate determination of scan period is a vital aspect of EEI. A minority of emitters are sector scan, but have limited scope for EEI. Scan period can be deduced from a plot of pulse amplitude against time. As amplitude resolution is typically 0.5 dB and tends to be noisy, the resulting plot is "blocky" and contains false peaks, and requires filtering to smooth out the data so as to identify the peak of each scan. This requires some sophisticated data processing. At least 5 successive scans are required to compute scan period to an acceptable accuracy. Once the scan period is derived, the individual scans can be superimposed and averaged to yield a smooth radiation pattern from which beamwidth can be derived. If the standard deviation of all pulse amplitudes is less than some pre-determined value, then the emitter is deemed to be non-scanning and the scan period and beamwidth analysis are suppressed.

To determine the scan period, the amplitude and time or arrival of all pulses are first collected into arrays. A peak detection routine is then used to locate all amplitude peaks. The time differences between all peaks greater than 0.1 sec are obtained and a histogram is constructed. Peak detection picks up the fundamental period and its harmonics. If the second peak is a non-harmonic of the first, then this is a sector scan. The two mean periods are output. For a circular scan, the mean of the fundamental peak and its standard deviation is computed.

Figure 6:
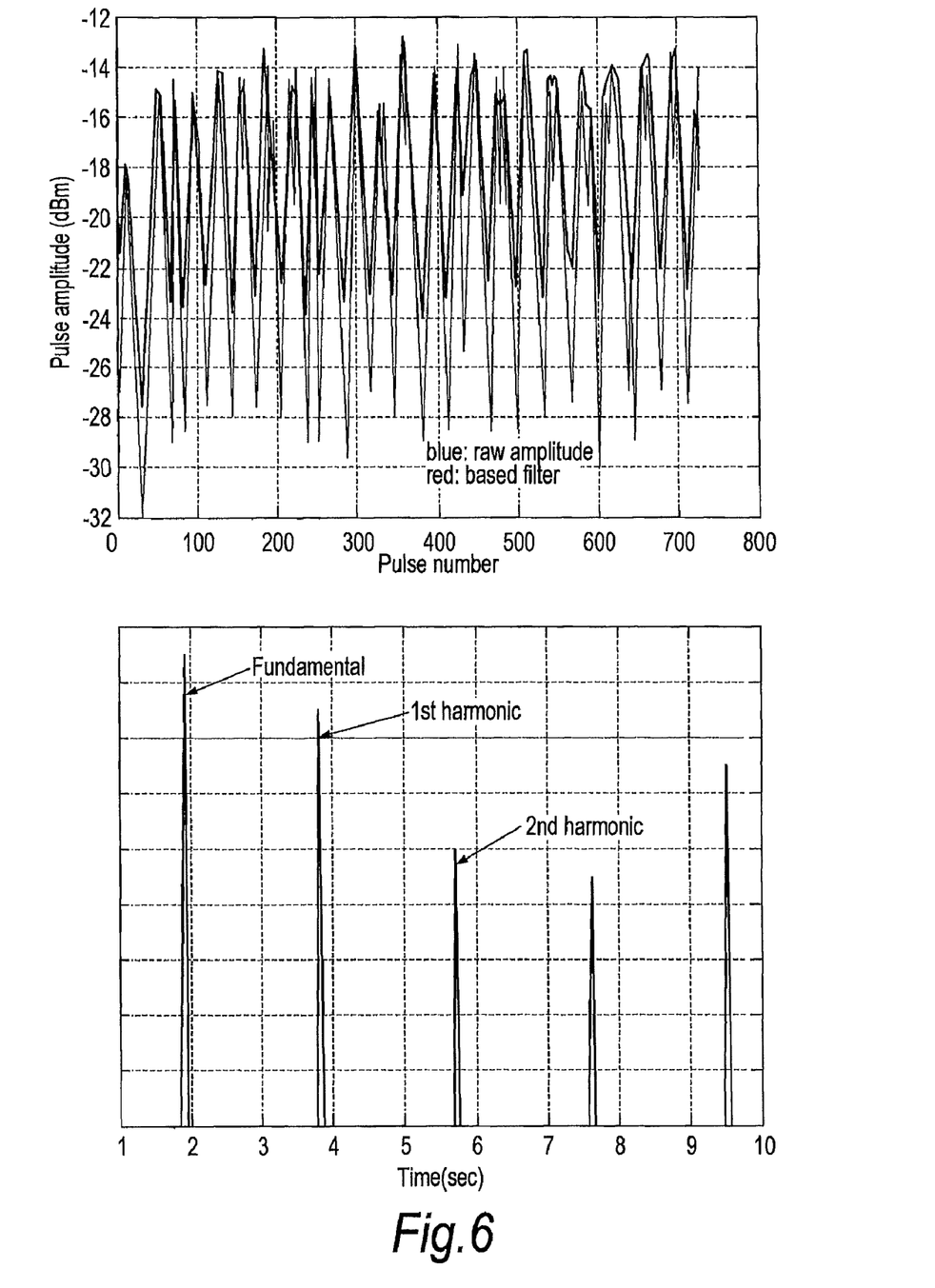
FIG. 6 shows two graphs, the first representing raw pulse amplitude data and base filter data plotted against pulse number, the second showing scan period histograms, clearly demonstrating the existence of fundamental, $1^{st}$ harmonic and second harmonic peaks.

The amplitude plot is convolved with a gaussian of variance equal to two bins. This is equivalent to a low pass filter that suppresses amplitude noise. The evaluation of scan period and its standard deviation is then repeated. Additionally, the convolution with successively broader gaussian shapes is repeated until the scan period converges with the standard deviation less than some pre-determined (from performance parameter data file) percentage of the actual scan period. (See FIG. 6).

If no convergence is achieved after 10 loops through the convolution, the data is deemed to be unreliable and the scan period is suppressed, as is the beamwidth.

Figure 7:
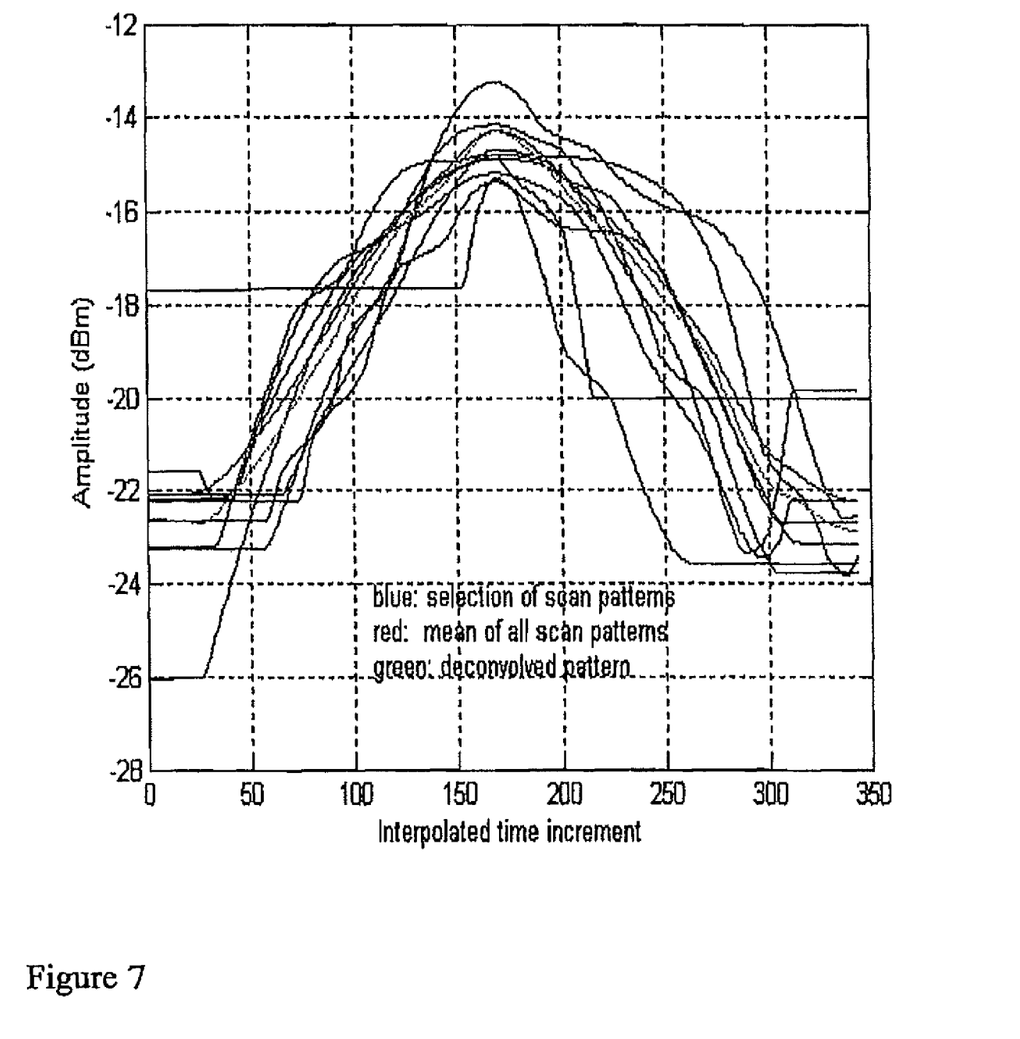
FIG. 7 shows multiple scan patterns, the mean scan pattern and the deconvolved pattern.

Knowledge of scan period enables all pulses to be associated with their own scan burst. For each scan burst, each associated pulse's time of arrival is normalised to the peak of the burst. This enables a scan pattern as a function of time to be constructed for each burst. Since each pulse has an arbitrary time offset from the peak, an interpolated scan pattern is constructed with fixed fine time increments for all scan bursts. Then scan bursts are superimposed and an average scan pattern is derived. Since the original amplitude data was convolved with a gaussian filter function, this function would artificially broaden the beamwidth. Therefore, the gaussian function is de-convolved from the averaged scan pattern to obtain the true scan pattern as a function of time increment. The pattern is normalised to the peak amplitude. If the amplitude is sufficiently above threshold, the 3 dB and 10 dB time increments are located. Knowledge of the scan period enables the time increment to be converted into angle, and thence the 3 dB and 10 dB beamwidths to be derived. (See FIG. 7).

Figure 8:
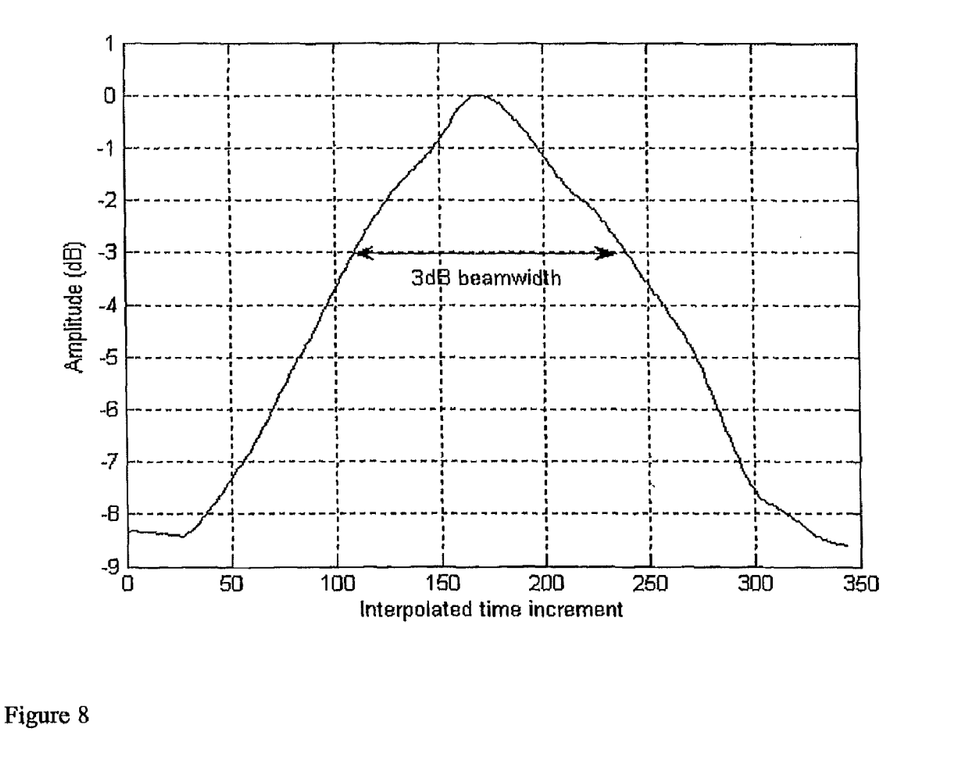
FIG. 8 shows the final mean scan pattern generated by the process in accordance with an embodiment of the invention.

If the signal was sufficiently high, it would be possible to resolve the sidelobe levels. However, this is rarely the case, and even the 10 dB beamwidth is generally unresolvable, as in the pattern shown in FIG. 8.

The standard deviation in the beamwidth can be estimated by computing the spread in pattern shapes for all scan bursts.

The data from EEI is output to a text file for subsequent library matching. Only those items associated with specific codes are output. Thus, for a stable PRI, only the mean PRI is output. For a stagger, the frame interval is output only if the random stagger flag is set to zero, etc.

The output jitter histogram is a coarse version of the actual data. The number of entries in the histogram is determined by a user defined parameter in the performance parameter data file. This is typically around 20. The bin size is chosen from 400, 800, 1600 or 3200 nsec to result in a number closest to this value.

When creating a library of emitters, all EEI data for each emitter is placed in the library entry.

The library matching described above may be implemented using the following steps:

a) Uses a "matching score" technique between emitter under investigation and each library entry.
b) Implemented using a $\chi 2$ test.
c) Use all common parameters which have been measured for emitter and library entry.
d) Requires knowledge of standard deviation (measured or inferred) for each common parameter.
e) Definition for n common parameters:

$$\chi_n^2 = \sum_{i=1}^{n} \frac{(x_i - X_i)^2}{\sigma_i^2}$$

f) Define "backing" for this value of $\chi 2$ as probability of obtaining a value of $\chi 2$ outside the limits of $\pm \chi 2$ of a normalised gaussian distribution.
g) Maximum value of backing value yields the best match.

When attempting to match an unknown emitter against each library entry, a "score" is defined based on a chi-square test utilising all common measured parameters. Some parameters may not be available due to noisy data. Only common parameters which have measured values are used. Thus n in the chi-square ($\chi 2$) equation is variable:

$$\chi_n^2 = \sum_{i=1}^{n} \frac{(x_i - X_i)^2}{\sigma_i^2}$$

Some variables, such as scan period and beamwidth, have measured standard deviations. Others, such as pulse width and PRI, must use inferred standard deviations, based on a calibration measurement. An additional contribution to standard deviation can be added to account for drift. In the formula above, x refers to a measured parameter; X is the library value and σ is the combined standard deviation. The "score" is the "backing" for the computed chi-square. This is the probability of obtaining a value of chi-square outside the limits of $\pm \chi$ of a normalised gaussian distribution. The backing parameter is obtained for all library entries of the same PRI type. The entry with the highest backing is defined as the match. If the maximum backing value is too small, e.g. 10%, then a new library entry is created for this emitter.

It will be appreciated that the above description is a general description of the system proposed. Specific parameters will now be described in relation to a specific embodiment. It will be appreciated that these parameters are not limiting but a suggested set of data relating to the above invention.

The EEI algorithm uses statistical techniques to compute fine grain detail of emitter radar performance. Scan period (or sector scan periods) to 10 ms rms accuracy; frequency to 1 MHz rms accuracy, and frequency agility; pulse width to typically 10 ns rms accuracy, and pulse width agility; 3 dB beamwidth; 10 dB beamwidth; stable PRI to 10 ns rms accuracy; staggered PRI (regular or random) elements and frame interval to 10 ns rms; and jittered PRI: Number of jitter clusters; PRI limits of each cluster to 10 ns rms; histogram of single jitter cluster also provided for library matching.

Output EEI data in text file format may include the following information: Error code; Scan code −1=non-scanning, 0=circular, 1=sector; Scan period (sec.) & standard deviation; Sector scan periods (sec.); Mean frequency (MHz) & standard deviation; Frequency limits (MHz); Number of discrete frequencies; List of discrete frequencies (MHz); Mean pulse width (μsec); Pulse width limits (μsec); Number of discrete pulse widths; List of discrete pulse widths (μsec); 3 dB beamwidth & standard deviation (deg.); and 10 dB beamwidth & standard deviation (deg).

Furthermore, the following information may be output in a text file: PRI code: 1—stable, 2—stagger, 3=jitter; Stable PRI (μsec) (if code=1); Number of frame intervals, 1 or 2 (if code=2); Frame intervals (msec) (if code=2); Number of stagger elements (if code=2); Number of distinct stagger elements (for double frame this is twice the number of stagger elements) (if code=2); List of stagger elements in correct order (min to max for random or min to max for frame 1, followed by min to max for frame 2, for double frame) (msec) (if code=2); Random stagger flag: 0=regular, 1=random; Number of jitter clusters (if code=3); List of jitter cluster lower limits (μsec) (if code=3); List of jitter cluster upper limits (μsec) (if code=3); Number of bins in coarse jitter histogram (if code=3 and a single cluster); Jitter histogram bin size (nsec) (400, 800, 1600 or 3200) (if code—3); and Normalised jitter histogram (if code=3).

It will be appreciated that the above description is for example only and the invention is not considered limited to the parameters given above.

The invention claimed is:

1. A method of identifying installations comprising:
   in a computer:
   statistically analyzing detected radar emissions received from said installations by analyzing datasets using histograms of all possible time differences to enable PRI characteristics to be efficiently identified and extracted using a peak detection algorithm, wherein each dataset includes a plurality of successive pulse descriptors;
   comparing analysis results to a library of existing data; and
   outputting a signal representative of an identity of the installation on display means to establish the identity of the installation,
   wherein the identity is established using a Fourier Transform of a PRI histogram such that a frame period, a fundamental cluster of PRI elements, and a number of stagger elements for a respective PRI with regular stagger are identified.

2. The method according to claim 1 further comprising:
   using relative amplitudes of detected peaks in the fundamental cluster to compute a number of repetitions of the stagger elements.

3. The method according to claim 1 further comprising:
   searching for discrete peaks in a PRI histogram of a fundamental jitter cluster to distinguish a random stagger from a jittered PRI.

4. The method according to claim 1 further comprising:
   using a convolution of a pulse amplitude plot with a Gaussian function of successively increasing width until a standard deviation of a scan period converges to a stable low value such that accuracy of a measurement of the scan period of an emitter with circular scan is enhanced.

5. The method according to claim 1 further comprising:
   normalizing a convolved pulse amplitude variation for all scan bursts in a respective dataset to a common reference and interpolating to a common time increment thereby enabling said scan bursts to be averaged; and
   constructing a de-convolved radiation pattern of the emitter, to derive 3 dB and 10 dB beamwidths.

6. The method according to claim 1 further comprising:
   testing an emitter signal against each member of the library using a chi-square test of EEI parameters of the emitter under test to create a matching score to identify a matching entry with a highest score.

7. A system comprising means for carrying out the steps claimed in claim 1.

* * * * *